(12) United States Patent
Emmert et al.

(10) Patent No.: US 10,351,931 B2
(45) Date of Patent: Jul. 16, 2019

(54) SEPARATION OF RECYCLED RARE EARTHS

(71) Applicant: Worcester Polytechnic Institute, Worcester, MA (US)

(72) Inventors: Marion H. Emmert, Worcester, MA (US); H. M. Dhammika Bandara, Willimantic, CT (US)

(73) Assignee: Worcester Polytechnic Institute, Worcester, MA (US)

( * ) Notice: Subject to any disclaimer, the term of this patent is extended or adjusted under 35 U.S.C. 154(b) by 395 days.

(21) Appl. No.: 14/996,538

(22) Filed: Jan. 15, 2016

(65) Prior Publication Data

US 2016/0208364 A1 Jul. 21, 2016

Related U.S. Application Data

(60) Provisional application No. 62/103,661, filed on Jan. 15, 2015.

(51) Int. Cl.
*C22B 59/00* (2006.01)
*C22B 1/00* (2006.01)
*C22B 7/00* (2006.01)

(52) U.S. Cl.
CPC ............ *C22B 59/00* (2013.01); *C22B 1/00* (2013.01); *C22B 1/005* (2013.01); *C22B 7/007* (2013.01); *Y02P 10/216* (2015.11); *Y02P 10/234* (2015.11); *Y02P 10/236* (2015.11)

(58) Field of Classification Search
CPC ........... C22B 7/07; C22B 1/005; C22B 59/00; C22B 3/02; C01B 7/0706
See application file for complete search history.

(56) References Cited

U.S. PATENT DOCUMENTS

| 5,429,724 A | 7/1995 | Greenberg |
| 2013/0283977 A1* | 10/2013 | Lakshmanan |
| 2014/0366687 A1* | 12/2014 | Zakotnik |
| 2015/0292060 A1 | 10/2015 | Laucournet et al. |

FOREIGN PATENT DOCUMENTS

| CN | 103773966 | | 5/2014 |
| JP | 01-183415 | * | 7/1989 |
| KR | 20140058004 | | 5/2014 |
| RU | 2097330 | * | 11/1997 |
| RU | 2431691 C1 | | 10/2011 |
| RU | 2011109473 A | | 9/2012 |
| WO | 199600698 A1 | | 1/1996 |
| WO | 2014064597 A2 | | 5/2014 |

OTHER PUBLICATIONS

Notification of Transmittal of the International Search Report and the Written Opinion of the International Searching Authority for PCT/US2016/013554, "Separation of Recycled Rare Earths", dated May 19, 2016.

* cited by examiner

*Primary Examiner* — Steven J Bos
(74) *Attorney, Agent, or Firm* — Armis IP Law, LLC

(57) ABSTRACT

Extraction of rare earths from end-of-use machinery having rare earth magnets provides a closed-loop process towards recycling rare earths from commingled devices having embedded magnets such as motors, generators and disk drives. A low temperature process selectively leaches the magnet material from mixed scrap containing shredded fragments of the machinery which includes other metals such as steel and copper. Filtration separates the other metals from the leached, dissolved magnet material, which is precipitated by oxalic acid to form oxalates in powder form, suitable for use in production of new rare earth magnetic material. Leaching acid, such as HCl (hydrochloric acid), is recoverable via pyrohydrolysis, and redirected back to the leaching step for completing the closed-loop aspect.

12 Claims, 2 Drawing Sheets

US 10,351,931 B2

SEPARATION OF RECYCLED RARE EARTHS

RELATED APPLICATIONS

This application claims the benefit under 35 U.S.C. § 119(e) of U.S. Provisional Patent Application No. 62/103,661 filed Jan. 15, 2015, entitled "RARE EARTH RECYCLING," incorporated herein by reference in entirety.

STATEMENT OF FEDERALLY SPONSORED RESEARCH

This invention was made with government support under grant NSF IIP-0968839, by the Center for Resource Recovery and Recycling (CR3), awarded by the National Science Foundation. The government has certain rights in the invention.

BACKGROUND

Rare earth materials, such as Nd (neodymium), Dy (dysprosium) and Pr (praseodymium) are beneficial in industrial applications and products such as disk drives, energy efficient lighting, and electro-magnetic apparatus such as generators and motors. In particular, rare earth magnets have found particular usefulness in hybrid and electric vehicles due to their compact structure.

Rare earth magnets are known for having high permanent magnetic properties, with magnetic forces substantially greater than their ferrite or ceramic counterparts. While such materials are not particularly in as short supply as the name might imply, rare earth magnets have found particular favor with industrial applications for permanent magnet motors, due to their strong magnetic field. The most common types of rare earth magnets include neodymium ($Nd_2Fe_{14}B$), and the older samarium-cobalt ($SmCo_5$) magnets. Due to their brittle and corrosion prone properties, rare earth magnets are usually coated with a protective substance to promote stability and longevity. Increasing popularity with hybrid and electric vehicles is supporting the demand for these materials.

SUMMARY

Configurations herein are based, in part, on the observation that conventional approaches to rare earth recovery, such as recovery from machines and devices utilizing rare earth magnets, require a relatively pure input of magnet scrap resulting from physical dismantling of the source devices. Rare earth magnets are often embedded within the machinery they support, such as in motor casings, generator rotors, and hard drive write heads for information recording. Unfortunately, conventional approaches suffer from the shortcoming that substantial dismantling of the donor device is required in order to access the installed rare earth magnet material. Further, conventional approached typically require high heat to melt or reform the magnet material. The need for high heat and complex, labor intensive disassembly required to obtain the recyclable magnet material burdens the value of recycled rare earths.

Configurations herein substantially overcome the above-described shortcomings by providing a low temperature selective leaching that dissolves and extracts the magnet material from fragmented machinery resulting from shredding, pulverizing or other physical agitation for producing a sufficiently granular mixed scrap from the recycling stock. Selective leaching involves a pH and concentration of a leaching agent or solvent sufficient to dissolve the magnet material while leaving extraneous materials such as steel and copper in solid form. Selective leaching can result from different reduction potentials between the extraneous materials and the rare earths. Redirection of the leaching agent or acid coupled with filtration of the extraneous materials and pyrohydrolysis for separating and removing the remaining metals completes the closed-loop sustainability.

Configurations disclosed herein provide a method to isolate rare earths in few process steps from end-of-life products such as motors and HD drives. The process relies on (a) demagnetization through heating; (b) shredding of the whole end-of-life material in order to break the present magnets; and (c) room temperature hydrometallurgical processing, which selectively dissolves the rare earth magnets in the presence of other materials (steel, copper, organic polymer). The introduction of preprocessing steps (a) and (b) makes the recovery of rare earths from challenging materials (coated or bonded magnets) possible at room temperature. At the same time, steel and copper can be recovered through simple filtration for further processing. After isolating the rare earth elements as oxalate precipitate, recovery of hydrochloric acid (the leaching acid) is proposed through acid recovery in analogy to recovery technologies used in steel pickling in order to arrive at a closed-loop process. The remaining mixture of salts (Zn, Fe, Co, Ni and Mn) can be considered to be a valuable resource for steel production. Recovery of HCl from the remaining solution may be performed using pyrohydrolysis, which is a common process in steel pickling.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
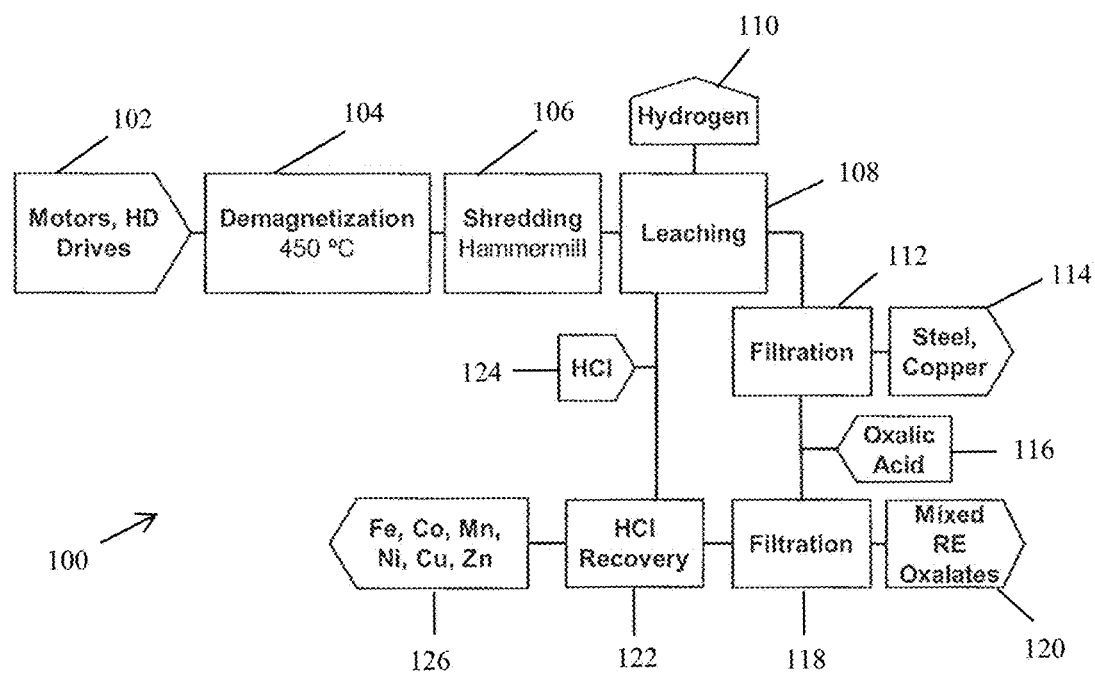
FIG. 1 is a process flow diagram of the approach as disclosed herein.

Recycling efforts for rare earths have been attempted for several rare-earth containing end-of-life products such as energy-efficient light bulbs and HD drives. In contrast, end-of-life motors containing RE magnets—e.g. from electric or hybrid vehicles—are currently not recycled. One issue with these materials is that the magnets are typically contained in the innermost part of the motors and thus not easily accessible. Another challenge for recycling these materials is caused by the strong magnetism which makes them desirable for manufacturing motors: as common recycling equipment such as shredders contain substantial amounts of ferromagnetic material, treating magnets with standard technologies remains difficult.

Previous efforts to recycle RE magnets have so far only focused on the magnet alloys without considering the materials mixture that is present in end-of-life products such as motors. In order to address these issues and to develop a methodology to selectively isolate REs from end-of-life motors without requiring previous manual disassembly, the disclosed approach depicts an efficient recycling process based on green chemistry principles: waste prevention, less hazardous processes, design for efficiency, use of renewable feedstocks, selectivity, and inherently safer chemistry for accident prevention. This process, as detailed below, has been established by using mechanical and thermal processing prior to chemical processing, through closely monitored, selective dissolution of the desired materials, the use of a renewable precipitation reagent (oxalic acid), and by executing the hydrometallurgical steps at room temperature, resulting in high recovery efficiencies up to 82% and excellent product purity (>99%).

Conventional approaches to recycling of rare earths and particularly material used to manufacture rare earth magnets and associated machinery such as motors, generators and storage devices include the following approaches.

A neodymium recovery process is suggested in U.S. Pat. No. 5,429,724, which shows a method of recovering neodymium (Nd) from waste by products of rare earth magnet manufacture. Two main waste by-products, NdFeB swarf and NdFeB slag, are treated by two respective chemical schemes as described above. However, the only major consumption of chemical compound in both schemes is hydrofluoric acid (HF). This approach employs recovery of Nd from only by-products of magnet manufacture, not from magnets in motors or other end-of-life products, and further employs highly toxic hydrofluoric acid, complicating safety and handling procedures and expenses. Further, the waste products employed are free magnet material, rather than embedded in existing apparatus where separation from steel, copper and other undesired substances is addressed.

Korean patent No. KR 2014058004 teaches a Method for recycling NdFeB magnet, which relates to system and method for recycling NdFeB magnet using molten magnesium. The method comprises the steps of: soaking NdFeB magnet scrap or waste magnet in molten magnesium to leach Nd, separating. Nd containing .molten magnesium from solid residue, making Mg—Nd alloy from separated. molten metal, and making Mg—Nd amorphous metal. This approach recovers Nd from only magnets/scrap magnets, not from magnets mixed with ferrous materials, and requires high temperatures (800-1000° C.) for producing molten compounds.

Chinese patent No. CN 103773966 shows separation recycling method of neodymium iron boron magnet waste material via hydrochloric acid dissolution, oxalic acid precipitation, hydrolysis, acidification oxidation. This patent relies on dissolving the neodymium iron boron magnet waste material into hydrochloric acid, and allowing acidolysis at not lower than 90° C. for 2-3 hours, performing solid-liq. separation, calcining the filter residue to obtain iron oxide red, heating the filtrate to 60-90° C., adding oxalic acid, allowing reaction for 25 min, and standing for 3-4 h; (3) performing solid-liq. sepn., washing the solid, drying, calcining at 850-1,000° C. for 2-4 h to obtain praseodymium-neodymium oxide, adding iron powder into the liq., and allowing hydrolysis at 90-95° C. and pH of 5-7 for 4-6 h; (4) performing solid-liq. Separation, and includes adding phosphoric acid under stirring, reacting at 60-90° C. for 30-60 min, adjusting pH to 2.5-3.5 with ammonia water, filtering to obtain filter cake, washing, drying to obtain battery grade iron phosphate. As with the above references, this approach recovers Nd from only relatively pure magnets/scrap magnets, not from magnets in motors or other end-of-life products.

The disclosed process includes principles of green chemistry. Incorporation of these principles at the design stage is expected to result in a commercially viable technology which can be implemented without the need to develop specialized equipment. Thus, the hydrometallurgical steps are executed at room temperature, while selective leaching of the desirable materials (rare earth magnets), simple filtrations, and selective precipitation all aim to ensure product purity and simple execution. Hydrometallurgy includes obtaining metals from their ores, generally involving the use of aqueous chemistry for the recovery of metals from ores, concentrates, and recycled or waste materials. All potential by-products of the initially hypothesized process are expected to be valuable input materials for other processes such as scrap sortation (steel and copper scrap) and pyrohydrolysis for the regeneration of HCl from the leaching solution. Diluted acid instead of concentrated acids were preferably used for the selective dissolution step and the use of solid acids as precipitation reagents is explored; both of these approaches generate inherently safer chemical processes.

Based on the aforementioned requirements for a sustainable and commercially viable recycling process, FIG. 1 is a process flow diagram 100 of the approach as disclosed herein. Referring to FIG. 1, the method of recovering rare earths (RE) from mixed scrap includes agitating demagnetized recycling stock to generate demagnetized mixed scrap. Step 102 depicts mechanical pre-processing through heat treatment and shredding, as this treatment will (i) simplify liberation of magnets from motors as well as further processing and (ii) allow processing bonded as well as coated magnets in the dissolution step 108 below.

A furnace of oven is employed for demagnetizing the recycling stock by heating to at least 400° C., and preferable 450° for at least 60 minutes, such that agitating includes shredding and crushing expired equipment to yield the mixed scrap, as disclosed at step 104. This includes, at step 106, crushing bonded magnets in the recycling stock sufficiently small to permit surface area contact with a leaching solution or acid such as HCl, and rupturing an outer coating on coated magnets sufficient to permit HCl contact. It should be noted that the rare earths are defined by the magnet material and include Nd (neodymium), Dy (dysprosium) and Pr (praseodymium) in the examples herein, however other magnetic materials and rare earths may be recycled in alternate approaches.

Configurations herein postulate that NdFeB magnets can be selectively dissolved upon addition of an acid in the presence of both steel and copper; this conclusion is formulated based on the low reduction potential of Nd ($E°=-2.323$ V), 12 which can be expected to affect the reduction potential of the NdFeB alloy and result in instability towards acids. Accordingly, the proposed approach selectively leaches, at room temperature, magnet material by dissolving the mixed scrap in an acid solution to separate the magnet material, as depicted at step 108. Selective leaching is performed at ambient temperatures absent external thermal sources, as no additional heating or cooling is required. The selective leaching as disclosed herein results in a solution of at least 88% pure rare earths. In an example configuration, the disclosed approach employs leaching via hydrochloric acid (HCl) to generate a solution of dissolved magnet material and releasing hydrogen, as shown at step 110, in which the selective leaching of the magnet materials results from the different reduction potentials of steel and copper compared to the magnet materials. Alternate solvents and/or leaching agents, such as sulfuric acid ($H_2SO_4$) may also be employed, as discussed further below.

After selective dissolution of the magnet alloy, the disclosed approach employs filtration at step 112 to filter undissolved metals from the acid solution and remove remaining metal scrap, such as steel and copper, from the mixture, resulting in a filtrate containing the rare earths (REs), as depicted at step 114. The composition of the recycling stock is expected to contain substantial quantities of steel and copper, due to the prevalence of electrical components such as motors and generators that are prime candidates for recycling.

Recycling includes precipitating the magnet material by adding oxalic acid to the acid solution to form oxalates, as disclosed at step 116. This performs selective precipitation of RE salts by addition of oxalic acid, or similar precipitation agent, in the presence of other metals (e.g. Fe). A filter or separator filters oxalates from the acid solution, as disclosed at step 118, thus isolating the precipitate by filtration, such that the oxalates are adapted for formation into new magnetic stock, as depicted at step 120. Filtration of the oxalates results in substantially around 99% pure rare earths in the new magnetic stock, and the yield of new magnetic stock is expected to be at least 82% of the magnet materials from the recycling stock of step 102, using the disclosed approach. The resulting filtrate from step 118 is expected to be a good input stream for pyrohydrolysis used in steel pickling, resulting in regeneration of HCl (or other acid employed) and production of mixed oxides, which in turn can be used for iron production in blast furnaces. Thus, the disclosed approach includes recovering HCl via pyrohydrolysis, as shown at step 122 and recirculating the HCl into the leaching of from mixed scrap (step 108), as depicted at step 124. The filtrate may also be employed for precipitating trichlorides from the filtered acid solution by pyrohydrolysis, as disclosed at step 126. Typical trichlorides include iron oxide and boron oxide, although others may be recovered depending on the composition of the recycling stock.

Figure 2:
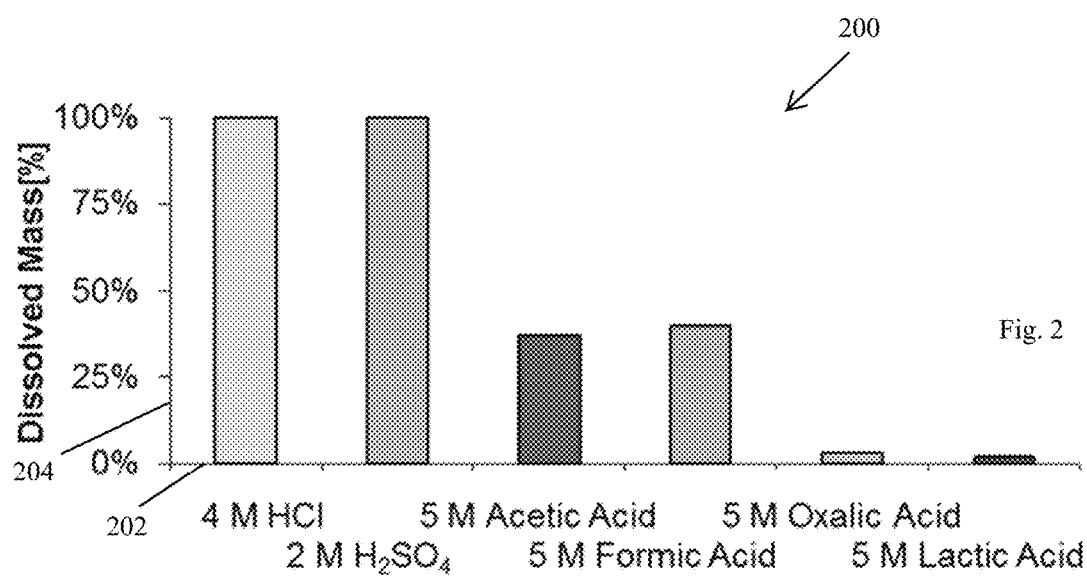
FIG. 2 is a graph of solvent selectivity of leaching magnet material in the approach of FIG. 1.

FIG. 2 is a graph of solvent selectivity of leaching magnet material in the approach of FIG. 1. The leaching step 108 of FIG. 1 focuses on identifying a suitable acid to achieve complete oxidative dissolution of NdFeB magnets, which at the same time would not react substantially with steel and copper. FIG. 2 indicates a graph 200 of percent dissolution (vertical axis 204) for various leaching agents on a horizontal axis 202. To this end, the most effective leaching acids include HCl and $H_2SO_4$. FIG. 2 also demonstrates that acetic acid, formic acid, oxalic acid, and lactic acid do not result in complete dissolution of the magnet material; in contrast, mineral acids (HCl, $H_2SO_4$) completely dissolve the magnet after 24 hours.

Figure 3:
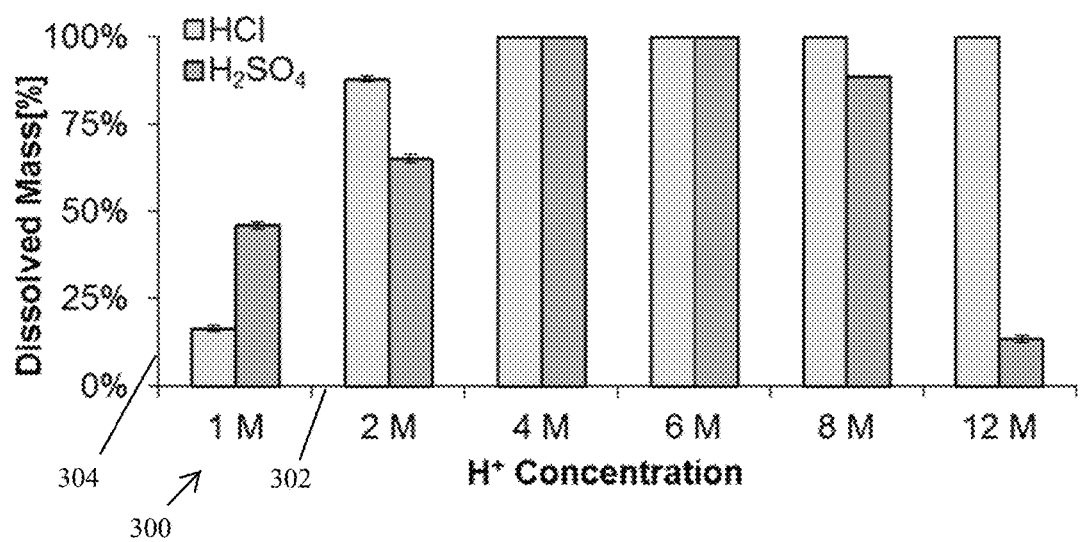
FIG. 3 is a graph of solvent concentration for leaching magnet material in the approach of FIG. 1.

In a subsequent qualification, shown in FIG. 3, a graph 300 of different molarities of HCl and H2SO4 are shown. A dissolved mass percentage is shown on a vertical axis 304, representing 24 hours leaching/dissolution time, plotted against the acid concentrations on a horizontal axis 302. Interestingly, all HCl solutions that were 4 M or more concentrated completely dissolved the magnetic material after 24 h; $H_2SO_4$ solutions also dissolved all the material at an acid concentration of 2 M (=4 M H+ concentration), but some higher concentrations lead to incomplete dissolution. This is likely due to the formation of a precipitate on the surface of the magnet material, which might act as a passivating layer. It should be noted that, as a matter of conventions, a solution of concentration 1 mol/L is also denoted as 1 molar (1 M). Accordingly, 4 M HCl was chosen as the ideal concentration for selective dissolution of NdFeB magnets, as this acid solution was highly reactive towards the NdFeB alloy representing the magnet material, but much less reactive towards the simple steel alloy used for the dissolution. Subsequent observations confirm that the widely used steel alloys 1018 and 304, and copper (another common component of motors) remained undissolved at room temperature, rather only the magnet material dissolves under these conditions, demonstrating that the desired selective leaching of magnets is possible With the leaching solution selected as HCl, consideration of selective precipitation of REs through addition of a second acid as precipitation reagent was explored. This approach was considered desirable, since it reforms in situ the acid (HCl) used for leaching; thus, this approach enables acid recovery from the process. Two reagents that may precipitate mixed RE salts are sulfuric acid to form RE sulfates of the general formula (RE)2(SO4)3 (RE=Nd, Dy, Pr) and oxalic acid to synthesize RE oxalates (RE)2(C2O4) 3.

An oxalate precipitate was obtained from the leaching solution by simple addition of oxalic acid, resulting in >99% yield of $(RE)_2(C_2O_4)_3$ after optimization, with a purity >99%. An additional benefit of this process is that oxalic acid can be used as a solid reagent, thus enhancing the safety of the process. Furthermore, no heat generation was observed with this approach, suggesting that this precipitation process is inherently safer and more efficient than the alternative sulfate route which generated substantial heat.

NdFeB magnets are brittle and can easily be attacked by chemicals, magnet manufacturers have found several ways to improve their stability. One of the common strategies is to mix the NdFeB materials with a resin to produce so-called bonded magnets. Presence of the resin indeed causes a delay in leaching compared to non-bonded magnets; however, all magnetic material was consumed after stirring in 4 M HCl for 24 h, thus suggesting that a longer leaching time would enable complete recovery of REs even from these less corrosion-resistant materials under selective leaching conditions.

Another common strategy to improve the chemical resistance of NdFeB magnets relies on coating the surface of the magnet with Ni. Since Ni has a much higher reduction potential ($E°=-0.236$ V) than Nd ($E°=-2.323$ V), the above developed conditions are hindered in dissolving coated magnets readily. However, leaching can be expected to proceed once the inside of coated magnets is exposed. Accordingly, the process includes shredding magnets using a hammermill, as fragmentation of magnets can be expected during this step before leaching takes place. Demagnetization is thus further beneficial before shredding can occur, since the attractive forces between the ferrous materials constituting the hammermill shredder and the magnets would remove materials from the process stream. Shredding allowed 88% of the original material to be recovered.

An example of the above approach was conducted as follows. A motor (76.6 g overall), consisting of NdFeB magnets (14×0.57 g magnets corresponding to 8.0 g; 17 mmol of a 15:1:4 mixture of Nd, Dy, and Pr, copper coils (7 g), and steel casing (56 g) was demagnetized in a furnace (temperature program: heat to 450 C for 105 min, keep at 450 ~C for 60 min, cool to room temperature for 105 min). After cooling, the motor was shredded with a hammer mill. The resulting scrap was treated with 4 M hydrochloric acid (200 mL, 800 mmol, 47 equiv.) for 6 to 24 h; hydrogen evolution was observed during the leaching process. The resulting leach solution showed the presence of 88% of rare earths (15 mmol; Nd:Dy:P=15:1:4) from the original magnet materials. The solution was filtered through a paper filter (pore size 11 μm) to separate the remaining steel and copper solids. The pH of the filtrate was adjusted to pH 0.60 with 15 mL of concentrated hydrochloric acid. Oxalic acid (4.0 g, 45 mmol, 3 equiv. compared to previously determined 15 mmol of rare earths) were added as a solid to the solution. After stirring the resulting suspension for 120 min at room temperature, the precipitate (mixed rare earth oxalates) was isolated by filtration and washed with 20 mL of water. Analysis of the remaining filtrate showed the presence of Zn, Fe, Co, Ni, Mn, Nd, Dy, and Pr in the filtrate. For further analysis, the precipitate was redissolved by addition of 20 mL of concentrated hydrochloric acid, and analysis showed the presence of 14 mmol of rare earths (Nd:Dy:Pr=15:1:3) in a purity of 99.8% with and impurity of 0.02% Fe. The overall recovery can thus be calculated to be 82%, based on the amount of rare earths present in the original motor material.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of recovering rare earths (RE) from mixed scrap comprising:
   agitating demagnetized recycling stock including magnet material to generate demagnetized mixed scrap by crushing and shredding to rupture an outer coating on the magnet material and exposing the magnet material for leaching solution contact;
   selectively leaching, at room temperature, the magnet material by adding hydrochloric acid to the crushed and shredded mixed scrap for dissolving the mixed scrap in an acid solution to separate the magnet material while leaving steel and copper undissolved;
   filtering undissolved metals including the steel and copper from the acid solution;
   precipitating the magnet material by adding oxalic acid to the acid solution to form oxalates; and
   filtering oxalates from the acid solution for forming new magnetic stock.

2. The method of claim 1 further comprising recovering HCl via pyrohydrolysis and recirculating the HCl into the leaching from mixed scrap.

3. The method of claim 1 further comprising demagnetizing the recycling stock by heating the recycling stock to at least 450° C. for at least 60 minutes, wherein agitating includes shredding and crushing the recycling stock including steel and copper to yield the mixed scrap.

4. The method of claim 1 further comprising:
   crushing bonded magnets in the recycling stock sufficiently small to permit surface area contact with the HCl; and
   rupturing an outer coating on coated magnets sufficient to permit HCl contact.

5. The method of claim 1 wherein the yield of new magnetic stock is at least 82% of the magnet materials present in the recycling stock.

6. The method of claim 1 wherein the selective leaching results in a solution of at least 88% pure rare earths.

7. The method of claim 1 wherein filtering the oxalates results in of rare earths in the acid solution being extracted for the new magnetic stock.

8. The method of claim 1 wherein the selective leaching is performed at room temperature absent external thermal sources.

9. The method of claim 8 wherein the acid solution is a 4 M solution of hydrochloric acid.

10. The method of claim 1 further comprising precipitating trichlorides from the solution by pyrohydrolysis after filtering the oxalates.

11. The method of claim 10 further comprising precipitating iron oxide and boron oxide.

12. The method of claim 1 wherein the rare earths include Nd (neodymium), Dy (dysprosium) and Pr (praseodymium).

* * * * *